United States Patent [19]
Cunningham

[11] 3,820,425
[45] June 28, 1974

[54] APPARATUS AND METHOD OF PRODUCING SCRAPLESS CARRIER DEVICES FROM A SIAMESE TUBE

[75] Inventor: Ernest R. Cunningham, Libertyville, Ill.

[73] Assignee: Grip-Pak, Inc., St. Louis, Mo.

[22] Filed: Dec. 13, 1972

[21] Appl. No.: 314,867

[52] U.S. Cl.............. 83/7, 83/9, 83/49, 83/54, 83/255, 83/405, 83/926 R
[51] Int. Cl............................ B26d 3/00
[58] Field of Search........... 83/9, 7, 39, 49, 54, 678, 83/926 R, 695, 404, 405, 255

[56] References Cited
UNITED STATES PATENTS
2,175,596  10/1939  Erling................. 83/54 X Primary Examiner—J. M. Meister
Attorney, Agent, or Firm—Michael Kovac

[57] ABSTRACT

Apparatus and method of forming a scrapless multi-packaging device from at least one elongated flattened tube of stretchable and elastic plastic material having upper and lower wall sections is disclosed as including the means or procedural steps of forming a plurality of transverse parallel slits throughout the upper and lower wall sections of the tube except at generally opposite connecting webs in each of the upper and lower wall sections, and thereafter cutting alternate connecting webs in the upper and lower wall sections of the tube to provide an interconnected series of flattened material bands defining the scrapless multi-packaging device.

7 Claims, 3 Drawing Figures

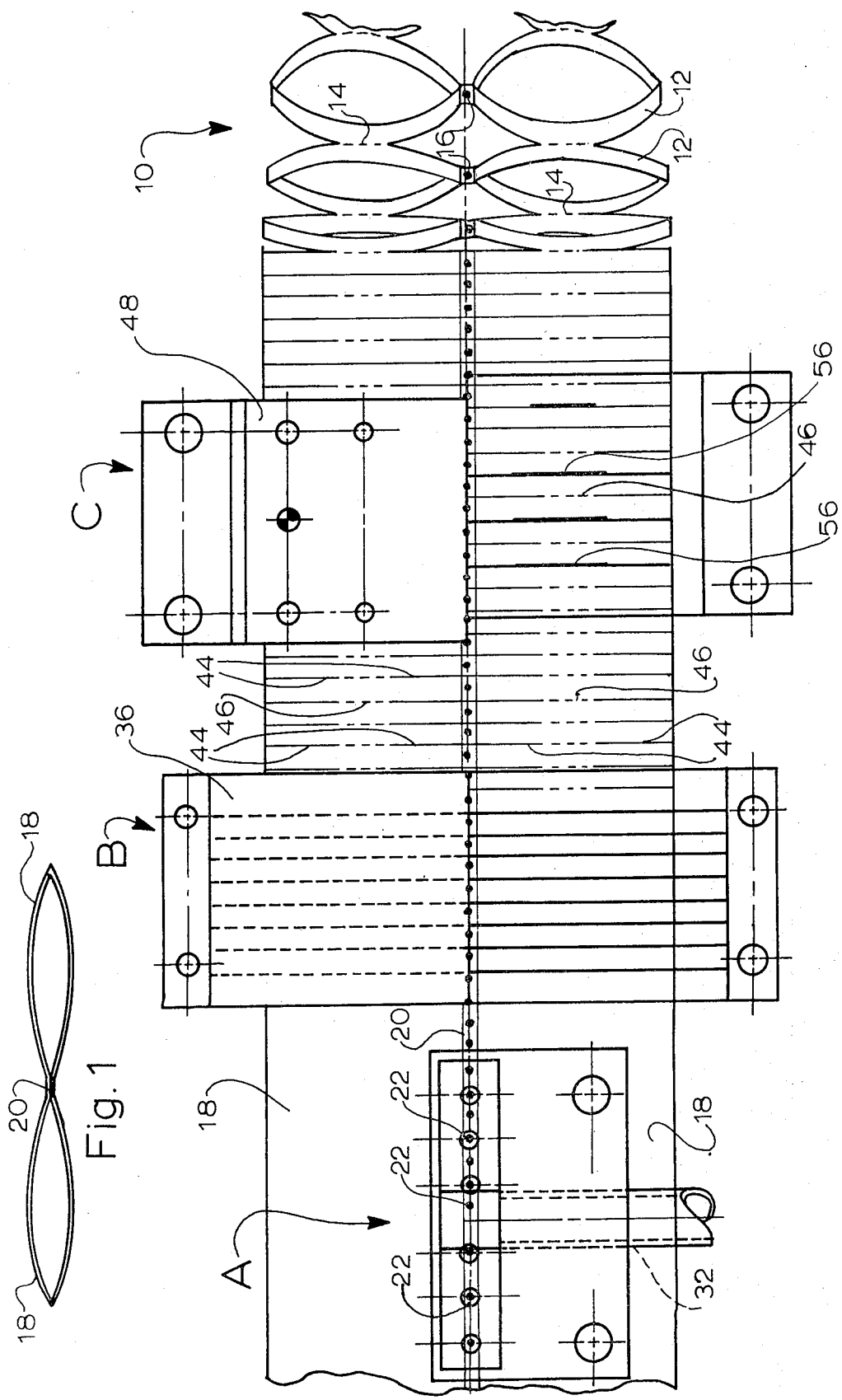

APPARATUS AND METHOD OF PRODUCING SCRAPLESS CARRIER DEVICES FROM A SIAMESE TUBE

SUMMARY OF THE INVENTION

In my co-pending patent application entitled "Container Package" Ser. No. 243,357 filed Apr. 12, 1972, now U.S. Pat. No. 3,785,484, I have disclosed a new and improved plastic scrapless multi-packaging device for containers as well as a new and improved method or technique of forming such plastic multi-packaging devices.

The present invention relates to said new and improved plastic scrapless multi-packaging device and is an improvement over the method of forming scrapless multi-packaging devices as disclosed in my aforementioned co-pending application. More specifically, the herein disclosed invention relates to commercial apparatus and method operations for high speed and precise manufacture of the aforementioned scrapless multi-packaging device.

It is an object of the present invention to provide a new and improved method and apparatus for manufacturing scrapless plastic multi-packaging devices.

More specifically, it is an object of the present invention to provide a method and apparatus for high speed and precise commercial manufacture of scrapless plastic multi-packaging devices.

These and other objects and advantages of the present invention are attained by a method and apparatus which forms a plurality of transverse parallel slits in the upper and lower wall sections of an elongated flattened tube of stretchable and elastic plastic material except at generally opposite connecting webs in each of the upper and lower wall sections, and thereafter cutting alternate connecting webs in the upper and lower wall sections to provide an interconnected series of flattened material bands defining the scrapless multi-packaging device.

BRIEF DESCRIPTION OF THE DRAWINGS

FIG. 1 is an end elevational view of an interconnected pair of flattened tubular elements from which scrapless multi-packaging devices can be formed in accordance with the herein disclosed method and apparatus;

FIG. 2 is a top plan view illustrating both the apparatus and technique for forming scrapless multi-packaging devices from the interconnected pair of flattened tubular elements depicted in FIG. 1.

DESCRIPTION OF THE PREFERRED EMBODIMENTS

Figure 3:
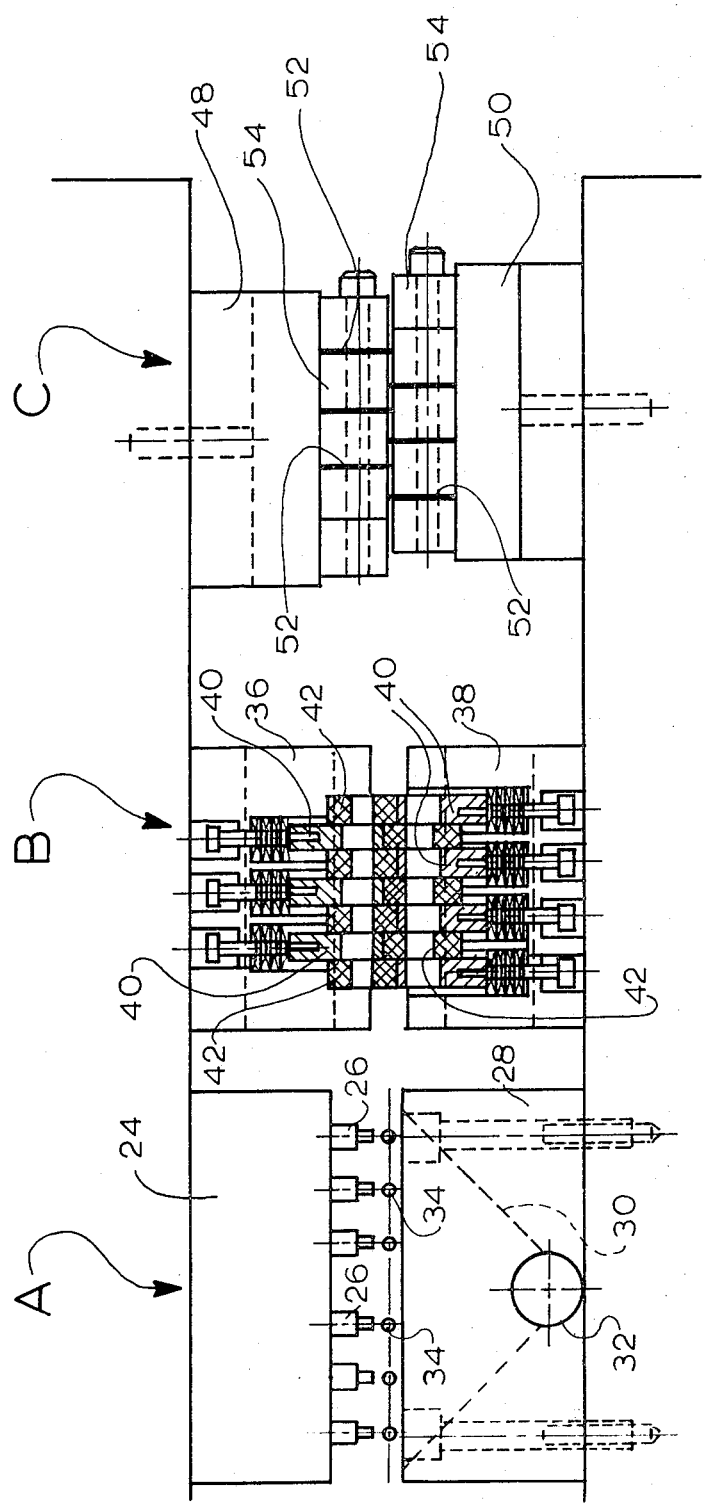
FIG. 3 is a side elevational view, partially in section, illustrating the apparatus shown in FIG. 2 of the drawings from a different vantage point.

At the right hand side in FIG. 2 of the drawings, there is shown a scrapless multi-packaging device 10 which is formed in accordance with the method and apparatus herein disclosed. As can be seen, the multi-packaging device 10 includes a plurality of opened-up flattened bands 12 which are interconnected to adjacent material bands in the same row across connecting webs 14 and to adjacent material bands in opposite rows across intermediate connecting web 16. In order to permit the multi-packaging device 10 to open up into an interconnected series of material bands 12, adjacent connecting webs 14 in the same row are attached to upper and lower margins, respectively, of adjacent material bands 12 in the same row. This is more fully described in detail in my aforementioned co-pending patent application.

In order to form scrapless multi-packaging devices 10 of the type just described, at least one elongated flattened tube of stretchable and elastic plastic material is provided in order that various slitting and cutting operations may be formed on such tube. In the illustrated embodiment of the invention show in FIG. 1 of the drawings, there is provided two flattened tubular elements 18 of stretchable and elastic plastic material which are attached at one end thereof by an intermediate connecting web 20. Any suitable extrusion or forming method may be utilized in providing the flattened tubular element construction illustrated in FIG. 1 of the drawings.

In accordance with the teachings of the present invention, there may be provided a hole punching station A in addition to the slitting station B and cutting station C illustrated in FIGS. 2–3 of the drawings. The hole punching station A is a desirable, but not a necessary operation in the method and apparatus now to be disclosed.

As best seen in FIG. 2 of the drawings, interconnected flattened tubular elements 18 of the type depicted in FIG. 1 of the drawings are intermittently or progressively advanced by suitable feeding means (not shown) in order to move the interconnected flattened tubular elements 18 through the hole punching station A, the slitting station B and the cutting station C.

At the hole punching station A, holes 22 are formed in the intermediate connecting webs 16 or 20 which join the elongated flattened tubular elements 18 at one end thereof. The holes 22 may be punched in either consecutive or alternating sequence in the intermediate connecting webs 16 or 20 dependent on the size of the flattened material bands 12 relative to the size of the holes 22, etc. As illustrated in FIG. 2 of the drawings, the holes 22 are punched in alternating sequence as illustrated by adjacent holes 22 being depicted with and without a circle surrounding the holes 22. Whether the holes 22 are formed in consecutive or alternating sequence, the punching operation is preferably performed while the slitting and cutting operations are being performed on the flattened tubular elements 18 in order that the tubular elements 18 can be positively advanced in precise incremental fashion between stations without any undesired transverse or longitudinal movement of the flattened tubular elements 18 which could result in imperfect slitting and/or cutting operations.

As illustrated in FIG. 3 of the drawings, the upper platten 24 at station A includes depending hole punches 26 which are arranged in the desired pattern. The lower platten 28 includes a funnel-shaped recess 30 which is connected to a vacuum manifold 32 for conveying the slugs 34 of material from the holes 22 back to a raw material hopper (not shown). The slugs 34 are the only scrap produced by the herein disclosed process; however, it is possible to eliminate scrap entirely by either omitting the hole punching operation or by providing an equivalent method of achieving precise incremental feeding of the elongated flattened tubular elements 18.

The holes 22 in the intermediate connecting webs 16 or 20 may also be configured and dimensioned in order to permit individual material bands 12 in adjacent rows to be separated from one another. This feature together with the separation of individual material bands 12 in the same row from each other as will be presently described enables the material bands 12 to separate from each other while remaining encircled about containers.

At slitting station B, there is provided upper and lower shoes 36, 38 respectively each having coacting slitting dies 40 and pressure pads 42 for forming a plurality of transverse parallel slits 44 in the elongated flattened tubular elements 18 throughout upper and lower wall sections thereof except at generally opposite connecting webs 46 which are provided in each of the upper and lower wall sections of the elongated flattened tubular elements 18. Each slitting die 40 mounted to the upper shoe 36 cooperates with the lower slitting die 40 on the lower shoe 38 so as to shear or slit the upper and lower wall sections of the elongated flattened tubular elements 18 except at the connecting webs 46 where interruptions (not shown) are suitably formed in the upper and lower slitting dies 40. The interruptions (not shown) in the upper and lower slitting dies 40 may be configured and arranged to permit separation or tearing along the connecting webs 46 for separating adjacent material bands 12 of the carrier 10 from each other.

Downstream of the slitting station B is a cutting and scoring station C which includes upper and lower cutting shoes 48, 50 respectively each having cutting dies 52. The cutting dies 52 on each of the upper and lower cutting shoes 48, 50 respectively are separated by gauge blocks 54 which also serve as back-up cutting blocks which are engaged by the cutting dies 52 on the upper and lower cutting shoes 48, 50 respectively.

As illustrated in FIG. 2 of the drawings, the cutting dies 52 cut alternate connecting webs as at 56 in order to provide the interconnected series of flattened material bands 12 defining the scrapless multi-packaging device 10. The cutting dies 52 simultaneously cut alternate connecting webs 46 as at 56 in order to provide the aforementioned arrangement which is illustrated at the right hand side of FIG. 2 of the drawings.

While alternate connecting webs 46 are being cut by the cutting die 52 at the cutting and scoring station C, it is also desirable that there be simultaneous scoring of alternate connecting webs 46 from the opposite alternate connecting webs 46 that are being cut by the cutting dies 52. This is achieved by allowing each cutting die 52 to cut alternate upper and lower wall sections of the flattened tubular elements 18 and alternate connecting webs 46 while allowing opposite alternate connecting webs to be scored. As will be appreciated, the cutting dies 52 are arranged to engage the back-up gauge block 54 so as to allow a connecting web 46 in one of the upper and lower wall sections to be cut while the other connecting web 46 is being scored. The scoring of the connecting webs 46 enhances the opening up of the material bands 12 in order to facilitate application by high speed assembly equipment.

From the foregoing, it will now be appreciated that the present invention contrmeplates a new and improved high speed and precise commercial manufacture of scrapless multi-packaging devices in a manner not heretofore contemplated.

I claim:

1. The method of forming a scrapless multi-packaging device including the steps of providing at least one elongated flattened tube of stretchable and elastic plastic material having generally parallel upper and lower wall sections, forming a plurality of transverse parallel slits in said elongated flattened tube throughtout the upper and lower wall sections except at generally opposite connecting webs in each of the upper and lower wall sections, and thereafter cutting alternate connecting webs in the upper and lower wall sections to provide an interconnected series of flattened material bands defining said scrapless multi-packaging device.

2. The method as defined in claim 1 including the step of providing at least two flattened tubular elements which are attached at one end thereof by an intermediate connecting web, and forming the plurality of transverse slits and subsequently cutting alternate connecting webs in the upper and lower wall sections of each of said flattened tubular elements.

3. The method as defined in claim 2 wherein said at least two flattened tubular elements are progressively fed from a slitting to a cutting station where the aforementioned operations are performed.

4. The method as defined in claim 3 wherein said at least two tubular elements are positively advanced in precise incremental fashion between stations.

5. The method as defined in claim 4 wherein said at least two tubular elements are positively advanced in precise incremental fashion by forming openings in the intermediate connecting web as said slitting and cutting operations are being performed to prevent any undesired transverse or longitudinal movement of said at least one elongated flattened tube.

6. The method as defined in claim 5 wherein said openings are formed in the intermediaty connecting web prior to the slitting and cutting operations.

7. The method as defined in claim 1 including the step of simultaneously scoring alternate connecting webs as opposite alternate connecting webs are being cut.

* * * * *